Aug. 26, 1969  R. B. JOHNSON ET AL  3,463,373
LOAD EQUALIZING MECHANISM FOR A FILM PULL DOWN SYSTEM
Filed June 23, 1967  2 Sheets-Sheet 1

ROBERT B. JOHNSON
THOMAS G. KIRN
INVENTORS

BY
ATTORNEYS

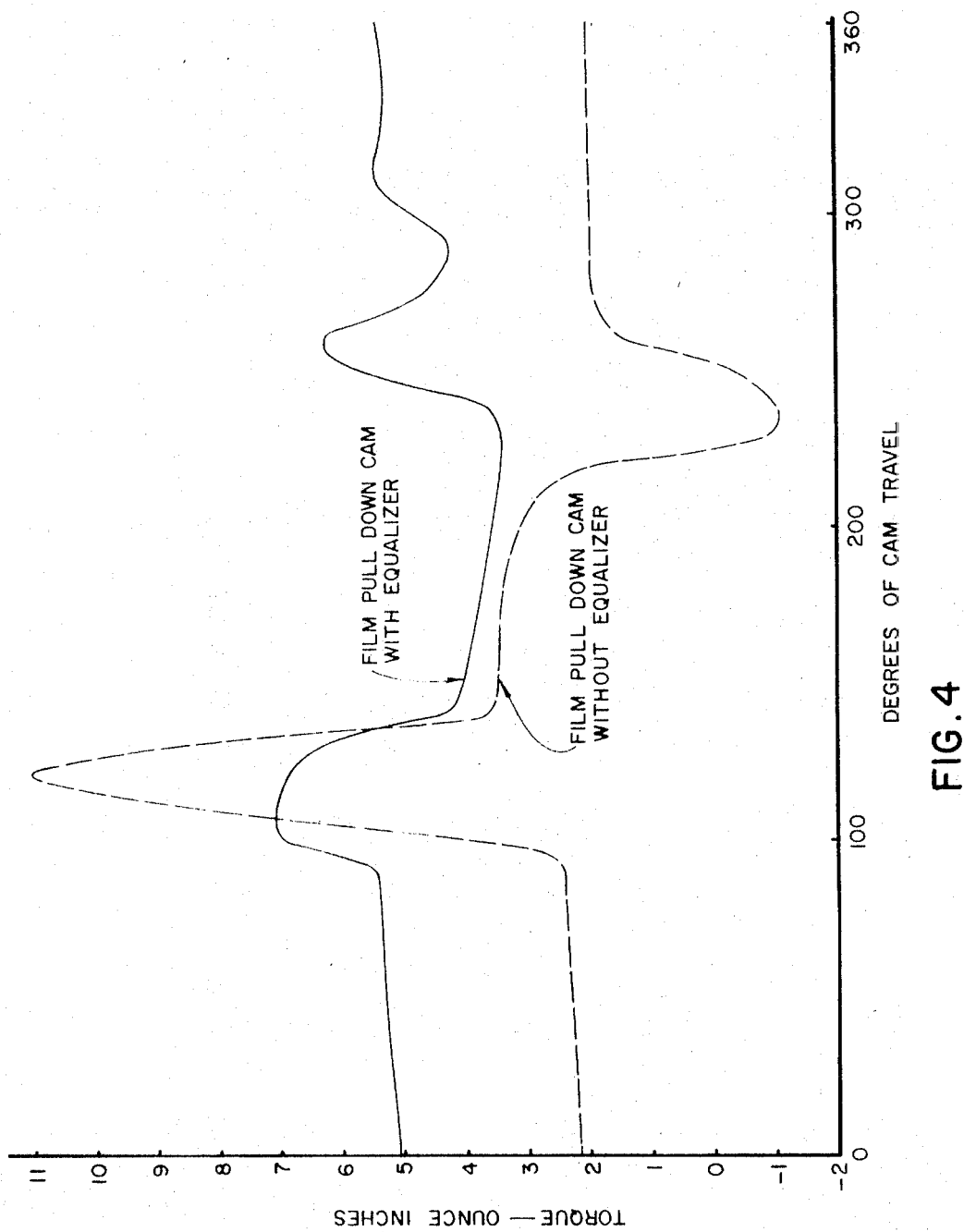

United States Patent Office 3,463,373
Patented Aug. 26, 1969

3,463,373
LOAD EQUALIZING MECHANISM FOR A FILM PULL DOWN SYSTEM
Robert B. Johnson and Thomas G. Kirn, Rochester, N.Y., assignors to Eastman Kodak Company, Rochester, N.Y., a corporation of New Jersey
Filed June 23, 1967, Ser. No. 648,283
Int. Cl. G03b 21/14
U.S. Cl. 226—49        8 Claims

ABSTRACT OF THE DISCLOSURE

A load equalizing mechanism for the fluctuating load of a film pull down system of a motion picture projector for reducing the starting torque requirements of the projector. This is accomplished by decreasing the load on the film pull down system by imparting energy to the film pull down system when the load is substantially at its maximum value, and increasing the load on the film pull down system by absorbing energy therefrom when the load is substantially at its lowest value, thereby producing a more uniform film pull down load requiring a reduced starting torque and hence drive means of reduced torque output.

BACKGROUND OF THE INVENTION

Field of the invention

This invention relates generally to load equalizing systems, and more specifically to a load equalizing mechanism for the fluctuating load of the film pull down system of a motion picture projector for decreasing the load when the load is substantially at its maximum value, and increasing the load when it is substantially at the lowest value. The load equalizing mechanism improves the starting characteristics of the projector by reducing the starting torque requirements thereof. Additionally, the load equalizing mechanism provides a more uniform film pull down system load throughout a cycle of operation thereof.

Description of the prior art

Film pull down systems for motion picture projectors comprising a film engaging means such as a film claw for engaging the perforations in the film are well known in the art. Such systems normally have a drive motor and cam means driven thereby for moving the claw through a cycle of operation in which it engages the film, moves downwardly to advance the film one frame in the projector film gate, disengages the film, and returns to its original starting position. In such film pull down systems, the load of the film pull down system is normally maximum during the position of the cycle in which the film engaging means engages and advances the film through the projector and necessitates a high starting torque for driving same. By load, we are referring to the resistance to movement of the movable parts of the film pull down system due to, among other things, friction between the parts, and friction between the film gate and the film advanced therethrough. In many instances, this load is futrher increased in film pull down systems of the type where the film engaging means is biased by a spring in a direction opposite to its direction of movement for advancing the film. Once the film has been advanced, the load of the system is reduced since the film engaging means is withdrawn from engagement with the film and normally only a small amount of torque or energy is required to move or return the film engaging means to its original position. The load of the system during such return movement of the film engaging means is further reduced in motion picture projectors of the type having a spring for returning the film engaging means to its original position. Accordingly, with film pull down systems of the general type discussed, the film pull down system load fluctuates over a considerable range throughout a cycle of operation of the system and requires a high starting torque. Naturally, the drive means for such a film pull down system must be designed to provide the maximum amount of torque or energy required to drive the system at any one portion of the cycle.

The load equalizing mechanism of this invention results in a film pull down system in which energy is imparted to the system, decreasing the film pull down load during that portion of the cycle of operation in which the load is substantially maximum, and increasing the load during that portion of the cycle in which the load is substantially minimum, resulting in a reduced starting torque requirement and a more uniform film pull down load throughout each cycle of operation. As a result, the heretofore high torque or energy output of the drive motor for driving the load is no longer necessary, and a smaller motor may be used resulting in a saving of space and increased economy.

SUMMARY OF THE INVENTION

This invention includes within its scope a load equalizing mechanism for the film pull down system of a motion picture projector for reducing its starting torque requirements by imparting energy to the system when its load is substantially at its maximum value, and absorbing energy from the system when its load is substantially at a minimum value. The load equalizing mechanism of this invention comprises a cam fixedly mounted on the drive shaft of the film pull down system, and a cam follower in engagement with the cam and secured to a preloaded leaf spring for imparting energy to the film pull down system through the cam when the load of the system is substantially at a maximum, and absorbing energy from the drive means when the load of the film pull down system is substantially at a minimum. This is accomplished by establishing the proper angular phase relationship and correlation between the load equalizing cam and an up-and-down cam of the film pull down system. The up-and-down cam imparts movement to the film pull down system for advancing the film through the projector in a manner well known in the art.

One of the objects of the present invention is to provide a load equalizing mechanism for the film pull down system of a motion picture projector for reducing its starting torque requirements by imparting energy to the system when its load is substantially at a maximum, and for absorbing energy from the drive means of the system when the system load is substantially at a minimum. This results in a film pull down system in which the load throughout a cycle of operation is more uniform and of a lower maximum value requiring a drive means of a lower maximum driving torque.

Objects and advantages other than those set forth above will be apparent from the following description when read in connection with the accompanying drawings.

BRIEF DESCRIPTION OF THE DRAWINGS

In the drawings:

FIG. 4 is a graph of torque in ounce-inches for driving the film pull down mechanism versus movement of the cam of the film pull down system through a single cycle or 360 degrees of operation starting at the point in the cycle when the claw of the film pull down system is retracted from the film and is substantially at its uppermost position.

DESCRIPTION OF THE PREFERRED EMBODIMENT

Figure 3:
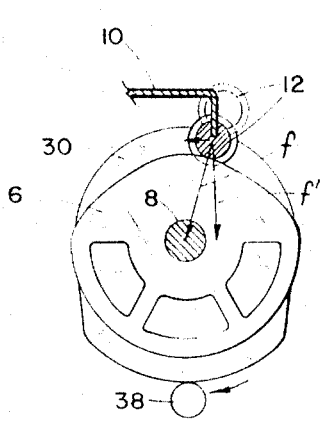
FIG. 3 is a side elevation view of the load equalizing mechanism of this invention showing the relationship of the load equalizing and film pull down cams, and a force diagram illustrating how energy is added to the film pull down system.

Referring to the drawing, the load equalizing mechanism of this invention comprises a cam 6 secured to a drive shaft 8. A pre-tensioned resilient means shown as a leaf spring 10 has one end secured to the projector and the opposite end thereof bent downwardly with a cam follower 12 secured thereto. The cam follower 12 is urged by the resiliency of spring 10 into engagement with the periphery of cam 6 and exerts a downwardly directed force $f$ against the cam, as best seen in FIG. 3. The force $f$ has a component $f'$ imparting movement to cam 6 in the direction of the arrow. The amount of the force or energy imparted to cam 6 depends upon the configuration of the periphery of cam 6 and the degree of pre-tensioning of spring 10. The amount of pre-tensioning is controlled by adjusting the end of the spring secured to the projector by virtue of elongated slots 14 in spring 10 and lock nuts 16.

The film pull down system of this projector is of the normal type comprising an indexing shuttle plate 18 having a plurality of film claws 20 at one end thereof for movement into and out of the perforations in a film. The shuttle plate 18 has an opening 22 for accommodating drive shaft 8, and is mounted for vertically oriented up-and-down movement on a pair of steel balls 24. The balls are interposed between recesses 26 in shuttle plate 18, into which the balls 24 partially extend, and a fixed V-shaped guideway 28 secured to the housing, not shown, of the projector. The balls 24 further provide a vertically oriented pivot about which plate 18 is pivotally movable laterally for moving the claws 20 into and out of the film perforations. This in-and-out movement of the film claws 20 is accomplished by cam surfaces on the face of a cam 30 secured to shaft 8 which cooperates with a cam follower 32 supported by a lever 34 pivoted about the stub shaft 35, and interposed between cam 30 and plate 18. A spring 36 secured to a lug on plate 18 urges the plate and balls 24 into engagement with guideway 28, and is located on one side of the vertically oriented pivot to urge plate 18 laterally in a counterclockwise direction, as viewed from above in FIGS. 1 and 2. On the opposite side of the vertically oriented pivot, shuttle plate 18 is provided with a headed pin 37 for rotatably supporting a roller 38 which functions as an up-and-down cam follower. A spring 40 secured to shuttle plate 18 urges roller 38 into engagement with the periphery of cam 30. A film pull down mechanism of the general type described is disclosed in detail in commonly assigned co-pending U.S. patent application Ser. No. 648,282, filed June 23, 1967 in the name of Thomas G. Kirn. The angular phase relationship and configuration of the cam surfaces on the face and periphery of cam 30 are such as to impart the required correlated up-and-down and in-and-out motion of the film claws 20 for advancing or reversing the film as is well known in the art.

Figure 1:
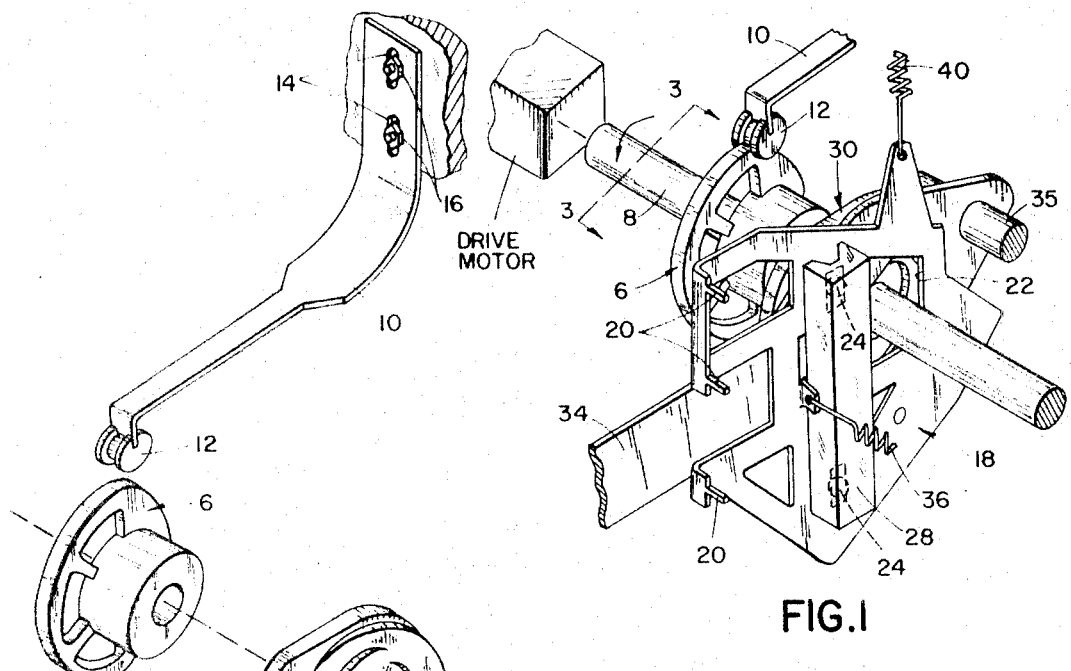
FIG. 1 is a perspective view of the load equalizing and film pull down mechanisms of this invention with other portions of the motion picture projector omitted for purposes of clarity.
Figure 2:
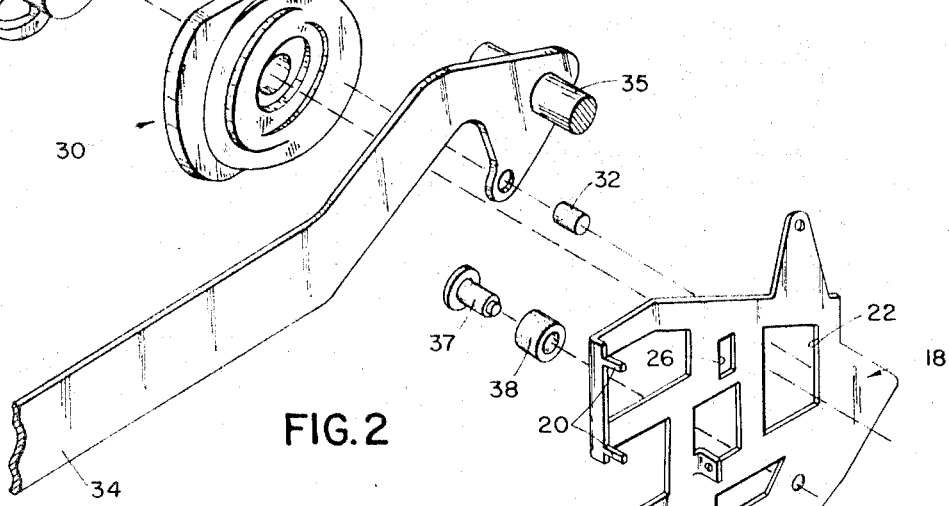
FIG. 2 is an exploded view of the load equalizing and film pull down mechanisms of FIG. 1.

With reference to FIG. 1, the aforementioned peripheral configuration and angular phase relationship of the load equalizing and the up-and-down cams 6, 30 respectively provide the imparting of maximum additional energy to the film pull down system by spring-mounted cam follower 12 at substantially the same time as cam 30 begins to move plate 18 and film claws 20 downwardly to advance the film. In addition, cam follower 12 is returned to its original position by equalizing cam 6 when shuttle plate 18 is returned to its original position by cam 30 and spring 40. Accordingly, spring 40 aids the film pull down system in returning cam follower 12 to its original tensioned position. The action of load equalizing cam 6, as best seen in FIG. 4, is to reduce the load of the film pull down system during the period in which its load is substantially maximum, and to increase the load during the remaining portion of the film pull down cycle when the cam follower is retensioned. It should be noted, however, that although the load of the film pull down system is increased during such remaining portion of the cycle, it is still below the maximum load of the system. The overall action of the load equalizing mechanism is to reduce the maximum load of the film pull down system and increase the minimum load while retensioning the load equalizing mechanism to make the load of the film pull down system more uniform throughout its entire cycle of operation. For this reason, a drive means having a smaller torque or energy output than normally required may be used in the projector.

The invention has been described in detail with particular reference to the preferred embodiment thereof, but it will be understood that variations and modifications can be effected within the spirit and scope of the invention.

We claim:

1. In a motion picture projector having means including a drive shaft for cyclically and intermittently transporting a strip of film through the projector and means for driving said film transporting means through a cycle of operation, said film transporting means normally requiring a high level of energy during one portion of its cycle of operation and a lower level of energy during another portion of its cycle of operation, the improvement comprising load equalizing means for absorbing energy from said driving means during the portion of its cycle of operation when the energy requirements of said film transporting means are low, and for imparting energy to said film transporting means during the portion of its cycle of operation when the energy requirements are high, said load equalizing means including
a first cam on said shaft;
a first cam follower engageable with said first cam; and
resilient means for urging said first cam follower into engagement with said first cam;
whereby the maximum instantaneous torque requirement of the driving means is reduced.

2. The improvement claimed in claim 1 wherein said film transporting means includes a second cam on said shaft and a second cam follower engageable with said second cam, said second having on one side thereof a pair of radially spaced cam surfaces of varying configuration selectively engageable by said second cam follower to provide transport of the film selectively in a corresponding one of forward and reverse directions.

3. The improvement claimed in claim 1 wherein said resilient means includes a leaf spring connected to said first cam follower.

4. In a motion picture projector for projecting an image of a strip of film onto a surface, the combination comprising:
a source of mechanical energy;
means responsive to said source for cyclically and intermittently advancing the strip of film through the projector, said film advancing means requiring more energy during at least one portion of a cycle of operation than during the other portions of the cycle; and
load equalizing means for absorbing energy from said source during at least a part of the cycle of operation and for imparting energy to said film advancing means during said one portion of the cycle, said load equalizing means including a first cam coupled to said film advancing means,
a first cam follower engageable with said first cam, and
resilient means movable from a tensioned position to a less tensioned position for urging said first cam follower into engagement with said first cam to add energy to said film advancing means, said resilient means being movable from said less tensioned position to said tensioned position by energy from said source during said part of said cycle of operation.

5. The improvement claimed in claim 4 wherein said film advancing means includes a second cam coupled to said first cam and a second cam follower engageable with said second cam, said second cam having on one side thereof a pair of radially spaced cam surfaces of varying configuration selectively engageable by said second cam follower to provide advancement of the film selectively in a corresponding one of forward and reverse directions.

6. The improvement claimed in claim 4 wherein:
said film advancing means includes a drive shaft;
said first cam is on said shaft; and
said resilient means includes a spring member connected to said first cam follower.

7. In a motion picture projector for projecting an image from a strip of film, the combination comprising:
means for intermittently advancing the strip of film through the projector, said film advancing means having a cycle of operation, during one portion of which one level of energy is required for operation and during another portion of which a lower level of energy is required for operation, said film advancing means including a drive cam and a drive cam follower engageable with said drive cam, said drive cam having on one side thereof a pair of radially spaced cam surfaces of varying configuration selectively engageable by said drive cam follower to provide advancement of the film selectively in a corresponding one of forward and reverse directions;

means supplying mechanical energy to said film advancing means for driving said film advancing means and intermittently advancing film through the projector; and load equalizing means for storing energy from said energy supplying means during the portion of the cycle of operation when a lower level of energy is required and for releasing energy to said film advancing means during the one portion of the cycle of operation, said load equalizing means including a compensating cam coupled to said drive cam, a compensating cam follower engageable with said compensating cam, and resilient means for urging said compensating cam follower into engagement with said compensating cam, whereby the maximum level of energy required to drive the film advancing means is reduced.

8. The improvement claimed in claim 7 wherein said resilient means includes a spring member connected to said compensating cam follower.

References Cited

UNITED STATES PATENTS 2,346,070  4/1944  Fuller _____ 226—121 X
2,757,569  8/1956  Isom _____ 226—60

M. HENSON WOOD, JR., Primary Examiner

R. A. SCHACHER, Assistant Examiner

U.S. Cl. X.R.

226—60, 62, 121

PO-1050
(5/69)

UNITED STATES PATENT OFFICE
CERTIFICATE OF CORRECTION

Patent No. 3,463,373          Dated August 26, 1969

Inventor(s) Robert B. Johnson and Thomas G. Kirn

It is certified that error appears in the above-identified patent and that said Letters Patent are hereby corrected as shown below:

Column 1, line 54, "position" should read --portion--.

Column 4, line 52, between "second" and "having" --cam-- should be inserted.

SIGNED AND
SEALED

DEC 2 - 1969

(SEAL)
Attest:

Edward M. Fletcher, Jr.
Attesting Officer

WILLIAM E. SCHUYLER, JR
Commissioner of Patents